(12) United States Patent
Biswas et al.

(10) Patent No.: US 7,624,195 B1
(45) Date of Patent: Nov. 24, 2009

(54) METHOD AND APPARATUS FOR DISTRIBUTED NETWORK ADDRESS TRANSLATION PROCESSING

(75) Inventors: Kaushik P. Biswas, San Jose, CA (US); Siva S. Jayasenan, Cupertino, CA (US); Michael J. Sullenberger, San Jose, CA (US); Mark A. Denny, San Jose, CA (US); Senthil Sivakumar, Cupertino, CA (US); Suresh Satapati, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 10/434,581

(22) Filed: May 8, 2003

(51) Int. Cl.
*G06F 15/16* (2006.01)
*H04L 12/56* (2006.01)

(52) U.S. Cl. .................. 709/245; 709/238; 709/243; 370/389; 370/401; 370/474

(58) Field of Classification Search ......... 709/238–244, 709/220–226, 227, 245; 370/229–235, 351–356, 370/389, 392, 474–476
See application file for complete search history.

(56) References Cited

U.S. PATENT DOCUMENTS

| | | | | |
|---|---|---|---|---|
| 6,175,867 B1 * | 1/2001 | Taghadoss | | 709/223 |
| 6,178,455 B1 * | 1/2001 | Schutte et al. | | 709/228 |
| 6,353,614 B1 * | 3/2002 | Borella et al. | | 709/238 |
| 6,567,405 B1 * | 5/2003 | Borella et al. | | 709/238 |
| 6,704,576 B1 | 3/2004 | Brachman et al. | | |
| 6,768,743 B1 * | 7/2004 | Borella et al. | | 370/401 |
| 6,801,528 B2 * | 10/2004 | Nassar | | 370/389 |
| 6,822,957 B1 * | 11/2004 | Schuster et al. | | 370/389 |
| 6,917,977 B2 * | 7/2005 | White et al. | | 709/226 |
| 7,043,247 B2 * | 5/2006 | Chitrapu | | 455/445 |
| 7,061,921 B1 | 6/2006 | Sheth | | |
| 7,068,647 B2 | 6/2006 | Fangman et al. | | |
| 7,154,891 B1 * | 12/2006 | Callon | | 370/392 |
| 7,227,872 B1 * | 6/2007 | Biswas et al. | | 370/465 |
| 7,280,557 B1 * | 10/2007 | Biswas et al. | | 370/465 |
| 7,554,918 B1 * | 6/2009 | Moore | | 370/235 |
| 2001/0048686 A1 * | 12/2001 | Takeda et al. | | 370/401 |
| 2002/0013847 A1 * | 1/2002 | Fisher et al. | | 709/226 |
| 2003/0033418 A1 * | 2/2003 | Young et al. | | 709/230 |
| 2003/0084162 A1 | 5/2003 | Johnson et al. | | |
| 2003/0106067 A1 * | 6/2003 | Hoskins et al. | | 725/119 |

(Continued)

OTHER PUBLICATIONS

Droms, R., "Dynamic Host Configuration Protocol", RFC 2131, Mar. 1997.*

(Continued)

*Primary Examiner*—Ario Etienne
*Assistant Examiner*—Brendan Y Higa
(74) *Attorney, Agent, or Firm*—Weaver Austin Villeneuve & Sampson LLP (57) ABSTRACT

Methods and apparatuses for distributing network address translation. By having a gateway inform inside devices of global addresses, the gateway can avoid performing many functions of a traditional NAT box. Specifically, an inside device is informed of a global address shared by all devices on the inside device's network segment. Each device on that segment would be assigned a range of ports to distinguish messages from separate devices that use the same global address.

21 Claims, 3 Drawing Sheets

U.S. PATENT DOCUMENTS

| | | | |
|---|---|---|---|
| 2003/0118002 A1* | 6/2003 | Bradd et al. | 370/352 |
| 2003/0133450 A1* | 7/2003 | Baum | 370/401 |
| 2004/0004968 A1 | 1/2004 | Nassar | |
| 2004/0109457 A1 | 6/2004 | Johnson et al. | |

OTHER PUBLICATIONS

E. Rosen et al, "Multiprotocol Label Switching Architecture," IETF RFC 3031, Jan. 2001.*

M. S. Borella, D. Grebelsky, I. Sidhu, and B. Petry, "Distributed Network Address Translation," Internet Draft, Apr. 1998 (work in progress).*

"RFC-2663 IP Network Address Translator (NAT) Terminology and Considerations," P. Srisuresh and M. Holdrege, Lucent Technologies, Aug. 1999, downloaded from: http://www.faqs.org/rfcs/rfc2663.html, downloaded Nov. 12, 2003.

Office Action dated Nov. 27, 2006, from related U.S. Appl. No. 10/434,581.

Office Action dated Jul. 18, 2008 for U.S. Appl. No. 10/455,640.

M.S. Borella et al., "Distributed Network Address Translation" Internet Draft, Apr. 1998 (work in progress).

Office Action dated Jun. 18, 2007 for related U.S. Appl. No. 10/455,640.

Office Action dated Jan. 3, 2008 for related U.S. Appl. No. 10/455,640.

Office Action dated Feb. 19, 2009 for related U.S. Appl. No. 10/455,640.

* cited by examiner

METHOD AND APPARATUS FOR DISTRIBUTED NETWORK ADDRESS TRANSLATION PROCESSING

BACKGROUND OF THE INVENTION

1. Field of the Invention

The present invention relates generally to the translation of addresses across networks and more specifically to the processing of such translations.

2. Description of the Related Art

Machines must have unique addresses if they are to communicate with each other over a network, such as the Internet. IPv4, the current version of the Internet protocol, provides 32 bits for the IP address. Although 32 bits theoretically allows 4,294,967,296 unique IP addresses, addresses are separated into classes and set aside for multicasting, testing and other special uses. The actual number of available addresses from Network Solutions, Inc., the entity that provides registration services for the Internet, are between 3.2 and 3.3 billion. With the explosion of the Internet, address depletion is a serious concern. Additionally, many enterprises want to manage their own networks, and do not want to rely on Network Solutions, Inc. for the addressing of every machine on their networks.

One solution for conserving addresses is referred to as network address translation (NAT). NAT allows an intermediary device (e.g., computer, router or switch) to act as an agent between a public network (e.g., the Internet) and a private local network. Each device on the local network is assigned a local IP address that is used only for local communications. Additionally, the local network is given a range of public IP addresses to represent the devices on the local network when communicating with the public network.

When a local computer attempts to communicate with a computer outside the local network, the intermediary device (NAT box) maps the local computer's IP address to one of the public network's IP addresses and replaces the local computer's address with public network's IP address. If the local network has more devices than public IP addresses, the public IP addresses must be shared among the local computers.

A feature of IP is multiplexing, which allows a computer to maintain several concurrent connections with remote computers using different TCP or UDP ports. A NAT box takes advantage of this feature by modifying the TCP/UDP ports for the traffic from the local computers such that it can uniquely map the local address and local TCP/UDP source port number (tuple) to the public IP address and assigned TCP/UDP source port number. Therefore, when a NAT box uses network address port translation (NAPT) it does not need the same number of public addresses as local devices. It should be noted that NAPT is included in the definition of NAT.

In addition, particular applications/protocols running on top of IP (e.g., DNS (domain name service), FTP (file transfer protocol), VoIP protocols like SIP (session initiated protocol), H.323) may embed IP addresses and/or TCP/UDP ports in the payload for various application specific purposes. NAT boxes are given application-specific knowledge in order to translate such addresses, as described in the Internet Engineering Task Force's RFC 2663, "IP Network Address Translator (NAT) Terminology and Considerations," by P. Srisuresh and M. Holdrege (August 1999), incorporated herein by reference in its entirety and for all purposes.

SUMMARY OF THE INVENTION

The present invention provides methods and apparatuses for distributing network address translation functionality across one or more private network devices. The components of this solution can include (1) a master GAPP/RAPID server (global address port provider/routable address port information distributor), such as a gateway sitting on an edge connecting the private network to the outside world; (2) intermediate GAPP/RAPID servers, such as intermediate aggregators, customer provider edge (CPE) equipments, etc., which interact with the master GAPP/RAPID server and get the outside address/port information from the upstream GAPP/RAPID server, and either take care of the NAT functionality themselves, or act as a GAPP/RAPID server to the requesting downstream GAPP/RAPID clients; and (3) GAPP/RAPID client, such as the end-hosts. Further, the address/port information distribution mechanism could be via DHCP option, or via proprietary messaging. The GAPP/RAPID server distributing the outside address/port information to the downstream devices can also maintain a mapping to a requestor's inside address.

In one embodiment a gateway first receives an IP address request from an intermediary router. An intermediary router will typically be a device, such as an aggregator, that is responsible for routing packets to devices on its network segment. A gateway will typically be a device that handles traffic between all of the devices on its network segment and devices not on its network segment.

In one embodiment the intermediary router can have the inside address assigned through static-configuration and issue requests for the outside address information. When the gateway fulfils this request it will maintain the mapping between the requestor's inside-address and the assigned outside-address.

In another embodiment, the intermediary router gets both its inside address and outside-address from the gateway. In this case the gateway assigns both a inside IP address and outside IP address to the intermediary router.

From the intermediary router's perspective, in one embodiment, the intermediary router first initiates a request for assignment of a inside address. The intermediary router then receives an assignment of both the inside and the outside addresses. The intermediary routers are responsible for the downstream devices. Responsible devices include all the devices on the intermediary router's network segment, such as edge routers (including customer premises equipment) and hosts (including home computers). An edge router typically handles traffic between an intermediary router and the devices on the edge router's network segment.

The intermediary router ensures traffic from the responsible devices use the outside address to communicate with outside devices. The intermediary router can ensure traffic uses outside addresses either by performing NAT functions or passing outside address information on to devices on the intermediary router's network segment.

From the edge router's perspective, in one embodiment, the edge router first initiates a request for assignment of an inside address. The edge router then receives an assignment of the inside address, a range of useable ports and a notification of an outside address that outside devices will use to communicate with the responsible devices.

Additionally, the edge router ensures that traffic from each responsible device uses the outside address and a port within the port range as an identifier for itself to communicate with outside devices. The edge router can also ensure such traffic uses outside addresses either by performing NAT functions or passing outside address information on to devices on the edge router's network segment.

DETAILED DESCRIPTION OF THE PREFERRED EMBODIMENTS

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention. For example, the present invention may include mechanisms for logging an error if a private address has no defined binding or rule set and there are no more available public addresses in the NAT device's pool for translation. Several typical procedures that may be performed on data along with translating the data and/or sending it to its destination are described further in U.S. Pat. No. 5,793,763 by Mayes et al., issued Aug. 11, 1998, incorporated herein by reference in its entirety and for all purposes.

NAT requires both header and application specific embedded payload inspection and modification, which is very processor intensive. The present invention allows a gateway to offload much of the NAT responsibility to other devices. As a consequence, the gateway can be implemented in hardware, which can make it both cheaper and faster.

Figure 1:
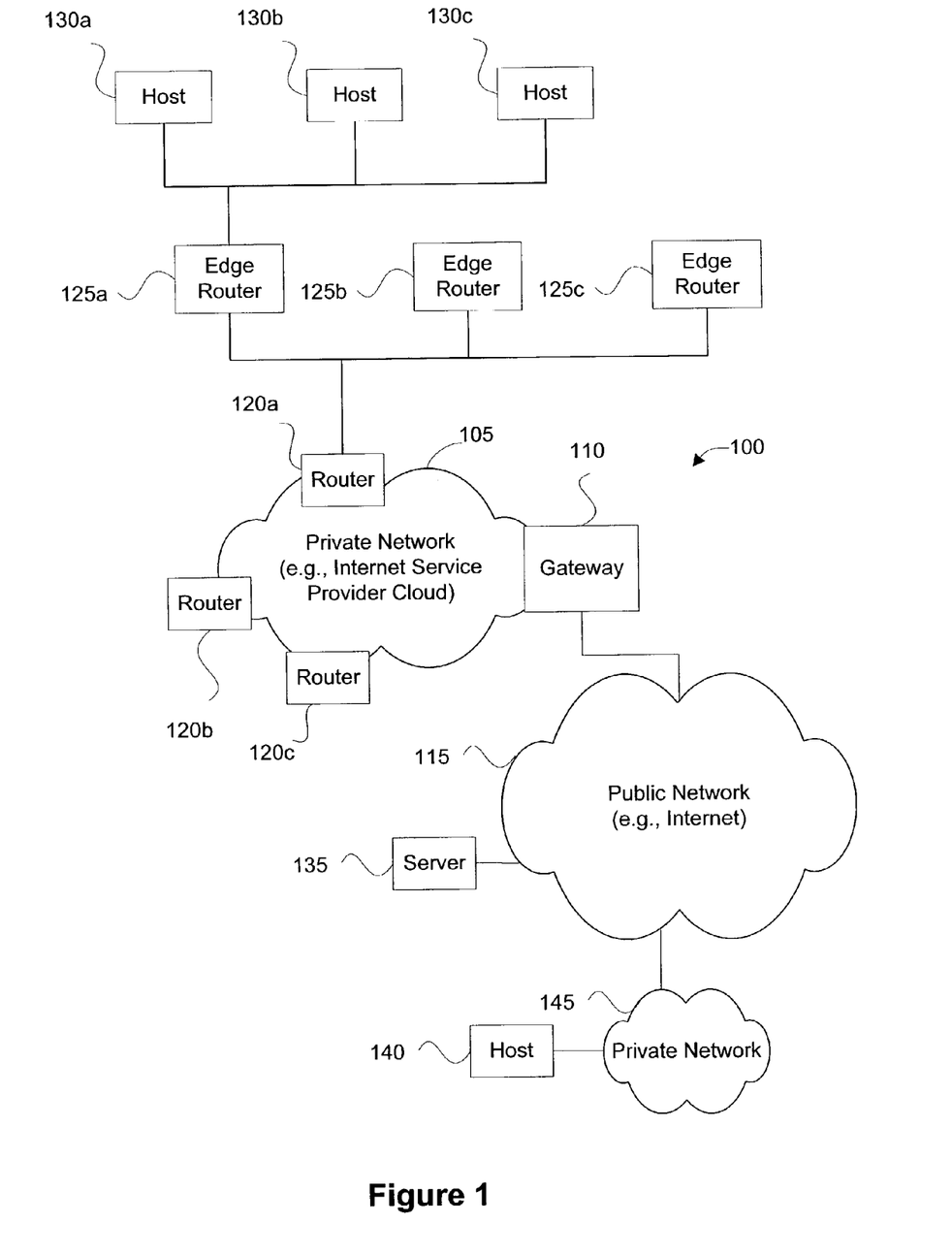
FIG. 1 is a block diagram illustrating an exemplary environment in which the present invention may be implemented.

FIG. 1 is a block diagram illustrating an exemplary environment in which the present invention may be implemented. A private network 105, such as an Internet Service Provider (ISP) is coupled with a gateway 110, which allows connectivity with a public network 115, such as the Internet. The private network 105 includes a plurality of intermediary hubs or routers 120a, 120b and 120c, such as aggregators that provide connectivity for a plurality of edge routers 125a, 125b and 125c. The edge routers 125a, 125b and 125c may be in the form of customer premises equipment (CPE), such as a cable modem, which may be coupled to one or more hosts 130a, 130b and 130c, such as PCs. Although only one intermediary router 120a is shown as being an aggregator (having an associated network segment of CPEs and PCs), multiple intermediary routers might be aggregators. For simplicity, the following discussion will focus on aggregators, CPEs and PCs. However, it should be understood that the invention is not limited to aggregators, CPEs and PCs.

Network addresses (e.g., IP addresses) used by devices of the public network 115 are referred to as "outside" addresses with respect to the gateway 110. Outside addresses may include addresses associated with devices directly connected to the public network 115, such as a web server 135 or devices on other private networks, such as correspondent host 140 connected to a correspondent network 145. Network addresses associated with devices 130a, 130b and 130c of the private network 105 and which are unique within private network 105 are referred to as "inside" addresses with respect to the gateway 110.

Although each address is unique within its network (e.g., the private address for host 130a is unique in private network 105), the inside addresses of the ISP's local network 105, the correspondent network 145 and the public network 115 may include addresses that overlap with each other. To avoid addressing collisions, addresses used within the private network 105 must be translated to addresses that are unique within the public network 115. These address translations from one network's address space are typically invisible to another network.

NAT is traditionally responsible for performing address and/or port translations within the header and payload. However, in the present invention as illustrated in FIG. 1 the gateway 110 is not solely responsible for these NAT functions. Instead, the responsibility is distributed between the gateway 110, the intermediary routers 120a, 120b and 120c and potentially the edge routers 125a, 125b and 125c.

A preferred method of distributing the processing is configuring each aggregator to be responsible for NAT functions for only those devices on their own network segment. However, pushing the NAT processing downstream introduces at least three potential concerns relating to: (1) notifying the downstream devices about NAT rules, (2) informing the downstream devices of the outside address so NAT functions can be performed and (3) routing the incoming data packet to the appropriate device.

The first issue (i.e., notifying the downstream devices about NAT rules) is potentially a problem because NAT functions are only performed on packets transmitted from an outside device to an inside device, or visa versa. Inside devices can communicate with each other without performing any address translations. One solution is to assign each aggregator at least two inside addresses. Only if the aggregator receives a packet addressed to the second inside address will it know that NAT functions are required. Otherwise, it will simply act on the packet as any standard aggregator would, forwarding the packet without translation.

Since the outside address is used by outside devices, the gateway 110 would have to perform little or no modifications to the incoming packet, depending on the routing method that is used (described later). In this configuration, there would, at most, be a one-to-one relationship between outside addresses and the aggregators responsible for NAT functions. Therefore, ignoring routing concerns, the only NAT functionality required of the gateway 110 would be header translation of certain outside source addresses, which could be fully implemented in hardware.

Otherwise, if there were more aggregators than available outside addresses, the gateway 110 would need to both alert the aggregators of their associated global address and have a mechanism that allowed the gateway 110 to distinguish between aggregators that shared the same global address. This can be achieved by giving a disjoint port-range along with the outside address to the aggregator. The gateway could then maintain a mapping between the aggregator's assigned outside-address/port-range and the aggregator's inside-address.

Another mechanism for allowing the gateway 110 to distinguish between aggregators could involve apportioning port ranges to each on-line aggregator. If a new aggregator came online when all global addresses and port ranges were exhausted, then the gateway 110 might send out a multicast message to all the aggregators querying which aggregators could share relinquish a portion of their port range. Based on, for example, whether the queried aggregator has free ports above a certain level and/or whether the aggregator is configured to respond to such multicasts, the aggregator could relinquish a port-range back to the gateway 110. The gateway could then assign the relinquished port range to the new aggregator. When the gateway 110 received an outside packet, it could then route the packet to a selected aggregator based on both the outside address and the port number.

There are various mechanisms by which the address and/or port-range information are distributed between the GAPP/RAPID entities. DHCP is one of them. DHCP is based on the Bootstrap Protocol (BOOTP), an Internet protocol that enables a diskless workstation to discover its own IP address. DHCP is described in RFC 2131 of the Network Working Group, R. Droms, March 1997, and BOOTP is described in RFC 951 of the Network Working Group, B. Croft, September 1985, both references are incorporated herein by reference in their entirety and for all purposes. RFC 2131 defines a DHCP server as a host that provides initialization parameters through DHCP. Essentially, a DHCP server allows IP addresses to be dynamically assigned to devices on a network. Dynamic addressing simplifies network administration because the software keeps track of IP addresses rather than requiring an administrator to statically provision the IP address for every device on the network. Current Microsoft Windows® operating systems have integrated DHCP client support.

The inside address is generally assigned using DHCP and the GAPP/RAPID server is responsible for assigning outside addresses and/or port-ranges. The GAPP/RAPID server can be part of the DHCP server or reside in a different device. If the GAPP/RAPID server and the DHCP server reside in different devices, a preferred method would include having the DHCP receive a DHCP request from a requestor that could include a special DHCP option telling the DHCP server that a global address is required. Upon seeing this special option in the request, the DHCP server could then interact with the GAPP/RAPID server in order to both obtain a outside address and set up the mapping between the inside address and the outside address and/or port-range that this requestor got. The GAPP/RAPID server can either manage the leases on the outside addresses and/or port-range or piggyback on the DHCP lease (i.e., the GAPP/RAPID server will terminate its lease when the DHCP lease is terminated). Several suitable architectures for providing different combinations of DHCP, GAPP/RAPID, and NAT capabilities are described further in the above referenced application Ser. No. 10/160,321. A simple implementation would have the GAPP/RAPID server, the DHCP server and the gateway 110 all reside in the same device.

Once the inside and outside addresses and/or port-ranges are assigned, data identifying both addresses must be routed to the same device. One method of routing two addresses to the same device is allowing the host device to artificially inject the outside address into the routing tables of the intermediate routers in the private network 105, and the gateway 110.

Typically, routing tables are created in each router device based on what is the "next hop." The next hop is the IP address of another host or router that is directly reachable via an Ethernet, serial link, or some other physical connection. Therefore, each entry in a routing table should at the least have an IP address, an associated next hop, and the interface of the next hop. Routing tables will usually have other fields, such as subnet masks, which allow a range of sequential addresses to be routed to the same interface.

Figure 2:
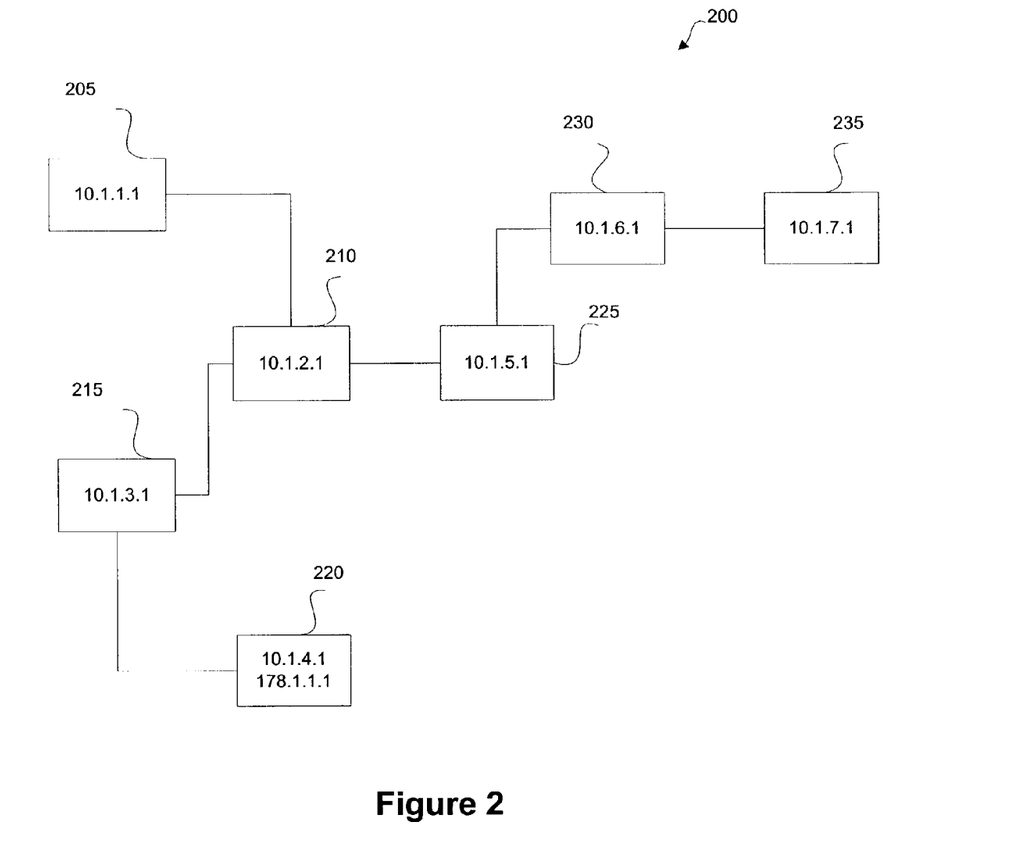
FIG. 2 is a block diagram of an arbitrary network topology of routers in which host route injection may be used.

FIG. 2 is a block diagram of an arbitrary network topology of routers 205, 210, 215, 220, 225, 230 and 235. If the router 225 with the IP address 10.1.5.1 were to send a packet to the router 220 with IP address 10.1.4.1, it would only be responsible for forwarding the packet to the router that is one hop closer. The internal routing table for the router 225 would indicate that the next hop for 10.1.4.1 is 10.1.2.1, and contain no further information concerning the path the packet is to follow. The router 210 with the IP address 10.1.2.1 would then recognize that 10.1.4.1 is associated with a next hop of 10.1.3.1 and forward the packet to the router 215 with the IP address 10.1.3.1. That router 215 would recognize that the router 220 with the IP address 10.1.4.1 is only one hop away, and would transmit the packet to that router 220.

If the router 220 were additionally identified with the outside IP address 178.1.1.1, its next hop router 215 would need to have its routing tables modified to allow it to associate two IP addresses with the same device.

A preferred embodiment would be to inject the host's outside IP addresses into the route table, avoiding the need to modify the next hop router. Injection can be accomplished by making the next hop router 215 believe that the device associated with the outside IP address is more than one hop away. Instead of telling the next hop router 215 that the router 220 is the final destination for, say, the IP address 178.1.1.1, the next hop router 215 will be told that the router 220 is merely the next hop for 178.1.1.1. The next hop router 215 would then associate the IP address of 10.1.4.1 as the next hop for 178.1.1.1. All other routers 205, 210, 225, 230 and 235 would similarly populate their routing tables as if the device associated with 178.1.1.1 were located at some point beyond the router 220 associated with 10.1.4.1.

Host route injection does not require that the gateway 110 perform any additional functions. Of course, it might be desirable for the gateway 110 to include other features (e.g., a firewall), but such features are not necessary for the invention.

Another mechanism to route back the return traffic would be tunneling. Tunneling requires that an aggregator first requests a inside address via DHCP, the DCHP server will also reserve the next consecutive inside address for the aggregator. For example, the aggregator might be associated with both 10.1.4.1 and 10.1.4.2. When the gateway 110 received an outside packet, it could either encapsulate (tunnel) the outside packet to the aggregator's second inside address or perform very basic header-only NAT on the outside packet such that the outside address is modified to the second inside address. This second inside address is routable in this private domain 105. Either mechanism would allow the aggregator to receive packets addressed to the aggregator's second inside address.

Another mechanism to route back the return traffic would be MPLS tag distribution. IP based routing is referred to as level 3 switching because IP addresses correspond to the network layer in the OSI model. Multiprotocol Label Switching (MPLS) is an IETF initiative that integrates Layer 2 information about network links (bandwidth, latency, and utilization) into Layer 3 within a particular autonomous network in order to simplify and improve IP-packet exchange. MPLS is described in RFC 3031 of the Network Working Group, E. Rosen, January 2001, incorporated herein by reference in its entirety and for all purposes.

When packets enter an MPLS-based network, label edge routers (LERs) give them an identifier called a label. These labels not only contain information based on the routing table entry (e.g., destination, bandwidth, delay, and other metrics), but also refer to the IP header field, Layer 4 socket number information, and differentiated service. Once this classification is complete and mapped, different packets are assigned to corresponding labeled switch paths (LSPs), where label switch routers (LSRs) place outgoing labels on the packets. The same LSP could, therefore, be used for both the first and second IP addresses.

MPLS employs a penultimate hop pop (PHP) mechanism, which allows the penultimate LSR to forward an unlabeled IP packet to the edge LSR. In PHP, the penultimate LSR strips the label from the packet and then forwards the unlabeled packet to the device having a matching IP address. Therefore, either the penultimate LSR would need to be configured to associate a device with two IP addresses, or the PHP mechanism would need to be disabled.

Fortunately, MPLS allows the edge LSR to advertise an explicit NULL label, which causes the penultimate LSR to forward un-popped MPLS packets instead of IP packets to the edge LSR. The edge LSR (i.e., the aggregator) would then pop all of its own packets. Once the aggregator stripped the label, it would be able to process the packet as appropriate, depending upon which address was used in the packet.

Regardless of how the outside packet reaches the aggregators, in a preferred embodiment of the invention the aggregators would further push NAT functions to the CPEs.

As with the aggregator, the CPEs would need to be both alerted to outside packets requiring NAT functions and have access to the outside address and/or port-ranges in order to perform the NAT functions. Therefore, just as the aggregators would be aware of their outside addresses and/or port-ranges, so would the CPEs. When a CPE requests an inside address, the aggregator (or some device in concert with the aggregator) would reply with an inside DHCP address and the outside address and/or port-ranges Additionally, the aggregator includes some mechanism that allows it to distinguish between packets addressed to the same outside address. In a preferred embodiment, each CPE would be given a port range. Allocation of port ranges could be accomplished through the aggregator, or some other device. The aggregator would then be able to route messages the appropriate CPE based on the packet's tuple. In other words, if the allocation function resided in the aggregator, the aggregator would act as a GAPP/RAPID server from the CPE side and as a GAPP/RAPID client from the other side.

If port ranges were used, one convenient mechanism that could be used to quickly route messages based on port range is by extending subnetting concepts to port ranges. A 16-bit port number could be viewed, for example, as either a set of 4-byte nibbles (a nibble has 4 bits) or 2-byte octets (an octet has 8 bits). For example, all ports between 0 and 1023 (0000.0000.0000.0000 and 0000.0011.1111 in binary nibble notation) could be apportioned to one CPE while ports between 1024 and 2047 (0000.0100.0000.0000 and 0000.0111.1111 in binary nibble notation) could be apportioned to another. A subnet mask of 1111.1111.1100.0000 (in binary nibble notation) would then be used to distinguish subnets.

If the CPE were not restricted to using certain port ranges, some other mechanism (such as a lengthy mapping table associating the CPE with a particular tuple) for routing packets to the appropriate CPE could be implemented.

Once the CPE was aware of the outside address, it could either perform the NAT functions itself, or obviate the need for the majority of NAT processing by informing the PCs of a global address and its own port range. If the PCs were to use the outside address when forming their IP packets, there would be no need to translate the source address. Of course, implementation would require PCs to have specialized IP/TCP stacks when accessing the network through the CPE, so such an implementation may not always be feasible.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, intermediate routers, such as aggregators, may be implemented in specially configured routers, switches or servers, such as specially configured router models 1600, 2500, 2600, 3600, 4500, 4700, 7200, 7500 and 12000 available from Cisco Systems, Inc. of San Jose, Calif. Edge routers, such as CPEs, may be implemented in routers, such as 1600, 2500, 2600, 3600, 4500, 4700, 7200, 7500 and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 3:
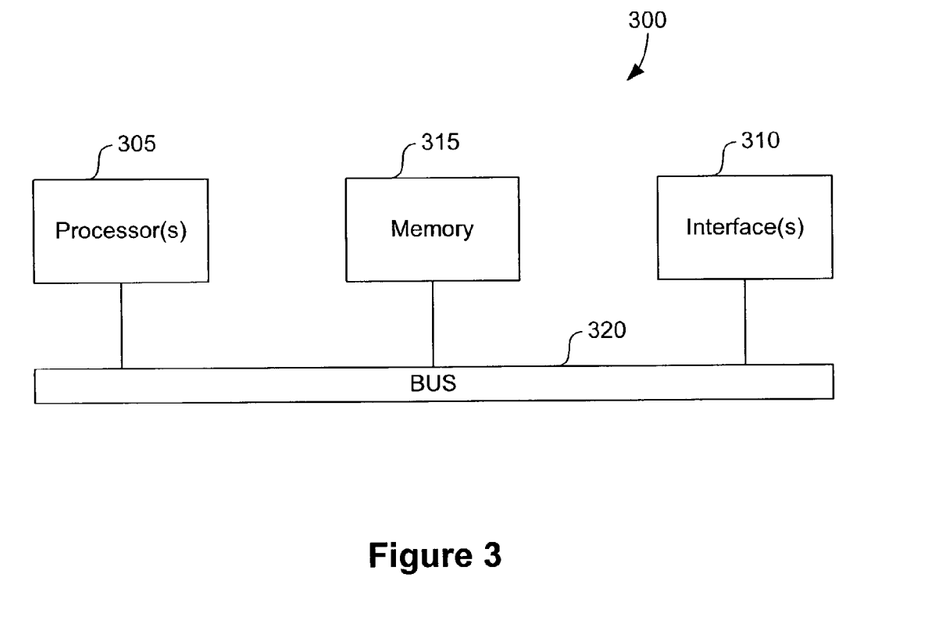
FIG. 3 is a diagram illustrating an exemplary network device in which various embodiments of the invention may be implemented.

Referring now to FIG. 3, a network device 300 suitable for implementing the techniques of the present invention includes a master central processing unit (CPU) 305, interfaces 310, memory 315 and a bus 320. When acting under the control of appropriate software or firmware, the CPU 305 may be responsible for implementing specific functions associated with the functions of a desired network device. For example, when configured as an intermediate router, the CPU 305 may be responsible for analyzing packets, encapsulating packets, and forwarding packets for transmission to a set-top box. The CPU 305 preferably accomplishes all these functions under the control of software including an operating system (e.g. Windows NT), and any appropriate applications software.

CPU 305 may include one or more processors such as those from the Motorola family of microprocessors or the MIPS family of microprocessors. In an alternative embodiment, the processor is specially designed hardware for controlling the operations of network device 300.

The interfaces 310 are typically provided as interface cards (sometimes referred to as "line cards"). Generally, they control the sending and receiving of data packets over the network and sometimes support other peripherals used with the network device 300. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 305 to efficiently perform routing computations, network diagnostics, security functions, etc.

Although the system shown in FIG. 3 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 315) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

What is claimed is:

1. A method of distributing network address translation (NAT) processing within a private network comprising:
   at a gateway device, receiving an IP address request from an intermediary router;
   at the gateway device, assigning a first IP address to the intermediary router;
   at the gateway device, assigning a second IP address to the intermediary router;
   from the gateway device, notifying the intermediary router of an outside IP address and a port range associated with devices on the intermediary router's network segment, wherein the outside IP address and the port range belong to an outside address pool to be utilized by the intermediary router for translating IP traffic that is being sent between a first device that is in the intermediary router's network segment and a second device that is outside the private network, and wherein the port range is apportioned from the outside address pool to the intermediary router so as to distinguish the intermediary router from other intermediary routers of the private network;
   routing outside IP traffic from the gateway device to the intermediary router's second IP address when the outside IP traffic includes the outside IP address and the port range as a destination so that such routing to the intermediary router's second address is indicative to the intermediary router that such intermediary router is to perform NAT on the routed outside IP traffic based on the outside IP address and the port range prior to routing such outside IP traffic to a final destination associated with said outside IP traffic; and
   routing inside IP traffic from the gateway device to the intermediary router's first IP address so that such routing to the intermediary router's first IP address is indicative to the intermediary router that such intermediary router is not to perform NAT on the routed inside IP traffic based on the outside IP address and the port range prior to routing such inside IP traffic to a final destination associated with said inside IP traffic.

2. The method of claim 1 wherein:
   the second IP address and the outside IP address associated with devices on the intermediary router's network segment are the same; and
   notifying the intermediary router of the outside IP address is accomplished through assigning the second IP address to the intermediary router.

3. The method of claim 2 wherein:
   the first IP address is statically provisioned.

4. The method of claim 2 wherein:
   a DHCP server receives the IP address request and assigns the first IP address; and
   a global address provisioning server assigns the second IP address.

5. The method of claim 2 wherein:
   a label switched path is associated with the first IP address in a Multiprotocol Label Switching environment; and
   routing outside IP traffic is accomplished through assigning the same LSP to packets addressed to both the first IP address and the second IP address.

6. The method of claim 1 wherein the first and the second IP addresses are associated with the same subnet and the outside IP address is not the same as either the first and second IP addresses.

7. The method of claim 6 wherein routing outside IP traffic includes header-only NAT translation of the outside IP address to the second IP address.

8. The method of claim 6 wherein routing outside IP traffic includes encapsulation of outside IP traffic via the second IP address.

9. The method of claim 1, further comprising:
   receiving an IP address request from a second intermediary router;
   sending out a multicast message if no more outside IP addresses are available;
   wherein the associated port range is identified by the intermediary router as being relinquished for use by other intermediary routers, in response to the multicast message;
   notifying the second intermediary router of a second outside IP address and the relinquished port range, that are associated with devices on the second intermediary router's network segment and are to be utilized to translate inside addresses of the intermediary router's network segment.

10. The method of claim 1 wherein the first IP address is associated with a lease, the lease also being associated with the outside IP address.

11. The method of claim 1 wherein the method is stored as instructions on a machine readable medium.

12. A gateway for distributing NAT processing within a private network, comprising:
   a processor;
   memory, operably connected with the processor;
   and a network interface, operably connected with the processor;
   wherein the processor is operable to perform instructions including:
      receiving an IP address request from an intermediary router;
      assigning two IP address to the intermediary router, the first IP address being useful for inside traffic, the second IP address being useful for outside traffic;
      notifying the intermediary router of an outside IP address and a port range associated with devices on the intermediary router's network segment, wherein the outside IP address and the port range belong to an outside address pool to be utilized by the intermediary router for translating IP traffic that is being sent between a first device that is in the intermediary router's network segment and a second device that is outside the private network, and wherein the port range is apportioned from the outside address pool to the intermediary router so as to distinguish the intermediary router from other intermediary routers of the private network; and
      routing outside IP traffic to the intermediary router's second IP address when the outside IP traffic includes the outside IP address and the port range as a destination so that such routing to the intermediary router's second address is indicative to the intermediary router that such intermediary router is to perform NAT on the routed outside IP traffic based on the outside IP address and the port range prior to routing such outside IP traffic to a final destination associated with said outside IP traffic; and
      routing inside IP traffic to the intermediary router's first IP address so that such routing to the intermediary router's first IP address is indicative to the intermediary router that such intermediary router is not to perform NAT on the routed inside IP traffic based on the outside IP address and the port range prior to routing such inside IP traffic to a final destination associated with said inside IP traffic.

13. The gateway of claim 12 wherein:
   the second IP address and the outside IP address associated with devices on the intermediary router's network segment are the same; and
   notifying the intermediary router of the outside IP address is accomplished through assigning the second IP address to the intermediary router.

14. The gateway of claim 13 wherein:
   a DHCP server receives the IP address request and assigns the first IP address; and
   a global address provisioning server assigns the second IP address.

15. The gateway of claim 13 wherein:
   a label switched path is associated with the first IP address in a Multiprotocol Label Switching environment; and
   routing outside IP traffic is accomplished through assigning the same LSP to packets addressed to both the first IP address and the second IP address.

16. The gateway of claim 12 wherein the first and the second IP addresses are associated with the same subnet and the outside IP address is not the same as either the first and second IP addresses.

17. The gateway of claim 16 wherein routing outside IP traffic includes header-only NAT translation of the outside IP address to the second IP address.

18. The gateway of claim 16 wherein routing outside IP traffic includes encapsulation of outside IP traffic via the second IP address.

19. The gateway of claim 12 wherein the processor is operable to perform instructions further including
   receiving an IP address request from a second intermediary router;
   sending out a multicast message if no more outside IP addresses are available;
   wherein the associated port range is identified by the intermediary router as being relinquished for use by other intermediary routers, in response to the multicast message;
   notifying the second intermediary router of a second outside IP address and the relinquished port range, that are associated with devices on the second intermediary router's network segment and are to be utilized to translate inside addresses of the intermediary router's network segment.

20. The gateway of claim 12 wherein the first IP address is associated with a lease, the lease also being associated with the outside IP address.

21. A gateway for distributing NAT processing within a private network, comprising:
   means for receiving an IP address request from an intermediary router;
   means for assigning two IP address to the intermediary router, the first IP address being useful for inside traffic, the second IP address being useful for outside traffic;
   means for notifying the intermediary router of an outside IP address and a port range associated with devices on the intermediary router's network segment, wherein the outside IP address and the port range belong to an outside address pool to be utilized by the intermediary router for translating IP traffic that is being sent between a first device that is in the intermediary router's network segment and a second device that is outside the private network and wherein the port range is apportioned from the outside address pool to the intermediary router so as to distinguish the intermediary router from other intermediary routers of the private network;
   means for routing outside IP traffic to the intermediary router's second IP address when the outside IP traffic includes the outside IP address and the port range as a destination so that such routing to the intermediary router's second IP address is indicative to the intermediary router that such intermediary router is to perform NAT on the routed outside IP traffic based on the outside IP address and the port range prior to routing such outside IP traffic to a final destination associated with said outside IP traffic; and
   means for routing inside IP traffic to the intermediary router's first IP address so that such routing to the intermediary router's first IP address is indicative to the intermediary router that such intermediary router is not to perform NAT on the routed inside IP traffic based on the outside IP address and the port range prior to routing such inside IP traffic to a final destination associated with said inside IP traffic.

* * * * *

UNITED STATES PATENT AND TRADEMARK OFFICE
CERTIFICATE OF CORRECTION

PATENT NO. : 7,624,195 B1
APPLICATION NO. : 10/434581
DATED : November 24, 2009
INVENTOR(S) : Biswas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Fourteenth Day of December, 2010

David J. Kappos
*Director of the United States Patent and Trademark Office*